(12) United States Patent
Barnett et al.

(10) Patent No.: US 7,216,338 B2
(45) Date of Patent: May 8, 2007

(54) CONFORMANCE EXECUTION OF NON-DETERMINISTIC SPECIFICATIONS FOR COMPONENTS

(75) Inventors: Michael Barnett, Seattle, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 454 days.

(21) Appl. No.: 10/081,329

(22) Filed: Feb. 20, 2002

(65) Prior Publication Data
US 2003/0159132 A1    Aug. 21, 2003

(51) Int. Cl.
G06F 9/44      (2006.01)
G06F 9/45      (2006.01)

(52) U.S. Cl. ............... 717/126; 717/143; 717/146; 717/147; 714/38

(58) Field of Classification Search ........ 717/124–148, 717/114; 709/224; 716/4; 702/108; 714/45, 714/33, 724, 38
See application file for complete search history.

(56) References Cited

U.S. PATENT DOCUMENTS

| | | | | |
|---|---|---|---|---|
| 4,864,569 A | * | 9/1989 | DeLucia et al. | 714/38 |
| 5,218,605 A | * | 6/1993 | Low et al. | 714/45 |
| 5,313,616 A | * | 5/1994 | Cline et al. | 717/127 |
| 5,513,315 A | * | 4/1996 | Tierney et al. | 714/37 |
| 5,623,499 A | * | 4/1997 | Ko et al. | 714/724 |
| 5,696,974 A | * | 12/1997 | Agrawal et al. | 717/152 |
| 5,724,504 A | * | 3/1998 | Aharon et al. | 714/33 |
| 5,754,860 A | * | 5/1998 | McKeeman et al. | 717/124 |
| 5,812,436 A | * | 9/1998 | Desgrousilliers et al. | 702/108 |
| 5,999,728 A | * | 12/1999 | Cable | 717/105 |
| 6,260,065 B1 | * | 7/2001 | Leiba et al. | 709/224 |
| 6,282,681 B1 | * | 8/2001 | Sun et al. | 714/738 |
| 6,314,557 B1 | * | 11/2001 | Shenderovich | 717/114 |
| 6,321,376 B1 | * | 11/2001 | Willis et al. | 717/124 |

(Continued)

FOREIGN PATENT DOCUMENTS

EP       690395 A2 *  1/1996
JP    02001681 A  *  1/1990

OTHER PUBLICATIONS

Hagwood et al., Reliability of conformance tests, IEEE Transactions on, Jun. 2001, vol. 50, Issue: 2, pp. 204-208.*

(Continued)

Primary Examiner—Wei Zhen
Assistant Examiner—Satish S. Rampuria
(74) Attorney, Agent, or Firm—Klarquist Sparkman, LLP

(57) ABSTRACT

To perform conformance checking of a software implementation with a (possibly non-deterministic) specification, a software implementation and a software specification are applied to produce a CT enabled implementation. Nondeterministic choices of the software specification result in assigning a corresponding choice of the CT enabled implementation to a variable. The CT enabled implementation includes a test that the variable then comprises one of the nondeterministic choices of the software specification. To perform conformance testing where the software specification includes ordered steps, and calls to methods of other classes (mandatory calls), a software object is produced and organized such that each step of the software specification has a corresponding code section in the software object. The software object includes instructions to generate an identification of a mandatory call comprised by the software specification, and instructions to test that the state of the implementation conforms to the software specification during the mandatory call.

26 Claims, 16 Drawing Sheets

U.S. PATENT DOCUMENTS

| | | | | |
|---|---|---|---|---|
| 6,526,544 | B1* | 2/2003 | Peled et al. | 716/4 |
| 6,631,516 | B1* | 10/2003 | Baumgart et al. | 717/143 |
| 6,698,012 | B1* | 2/2004 | Kossatchev et al. | 717/126 |
| 2002/0133501 | A1* | 9/2002 | Raduchel et al. | 707/102 |
| 2003/0028498 | A1* | 2/2003 | Hayes-Roth | 706/17 |
| 2003/0033406 | A1* | 2/2003 | John et al. | 709/224 |
| 2003/0084428 | A1* | 5/2003 | Agostini et al. | 717/117 |
| 2004/0103396 | A1* | 5/2004 | Nehab | 717/127 |

OTHER PUBLICATIONS

Weyuker et al., Analyzing partition testing strategies, Jul. 1991, IEEE Trans. Software Eng'g., vol. 17, pp. 703-711.*

Henniger et al., Specification and testing of the behavior of network management agents using SDL-92, IEEE/ACM Transactions on, Dec. 1996, vol. 4, Issue: 6, pp. 951-961.*

IBM Technical Disclosure Bulletin, User Configurable Local Storage Registers, IBM, May 1976, vol. No. 18, Issue: 12, pp. 3971-3975.*

Rosenthal, What is this thing called conformance, NIST/ITL Bulletin, Jan. 2001, pp. 1-3.*

Rosenthal, Presentation:What is this thing called conformance, NIST/ITL Bulletin, Dec. 2000, power point presentaion.*

Gray, Overview of Conformance Testing, NIST/ITL Bulletin, Jan. 1999, pp. 1-5.*

Gallagher, Conformacne testing of object-Oriented components specified by state/transition classes, NIST/ITL Bulletin, 2000, pp. 1-11.*

Liburdy et al., Formal specification language in conformance testing, Software quality week, 1998, pp. 1-16.*

Bruin et al., Scenario-based analysis of component compositions, Vrije University, Amsterdam, pp. 1-15.*

Hierons et al., Testing conformance to a quasi-nondeterministic stream X-machine, Brunel University, 2001, pp. 1-29.*

Seongyong et al., INAP conformance test system development and verification usign IUT simulator, IEEE, 1998 pp. 3356-3361 vol. 6.*

Yujun et al., IPv6 conformance testing: theory and practice, IEEE, Oct. 2004 pp. 719-727.*

Dibuz et al., An easy way to test interoperbility and conformance, IEEE, Mar. 2006 p. 9 pp. 1-9.*

Barnett, M. et al., *Conformance Checking of Components Against Their Non-deterministic Specifications*, Microsoft Technical Report, MSR-TR-2001-56, Jun. 2001.

Barnett, M. et al., *Spying on Components: A Runtime Verification Technique*, Workshop on Specification Verification of Component Based Systems, OOPSLA, Oct. 2001.

Barnett, M. et al., Using Abstract State Machines at Microsoft: A Case Study, ASM Conference 2000.

Barnett, M. et al., Specification, Simulation And Testing of COM Components Using Abstract State Mcahines, ASM Conference Feb. 2001.

Bruno, J. et al., jContractor: A Reflective Java Library to Support Design by Contract, Reflection 1999: 175-196.

Kramer, R., iContract—The Java Design by Contract Tool, Proceedings of Technology of Object-Oriented Languages and Systems, Tools-USA, IEEE Press, 1998.

Barnett et al., "The ABCs of Specification: AsmL, Behavior, and Components," in *Informatica*, vol. 25, No. 4, pp. 517-526, Nov. 2001.

Jonkers, "ISpec: Towards Practical and Sound Interface Specifications," *Appeared in* Grieskamp et al. (Eds.): *IFM 2000, LNCS 1945*, pp. 116-135, *Springer-Verlag* (2000), 20 pages.

Müller et al., "Modular Specification and Verification Techniques for Object-Oriented Software Components," In Gary T. Leavens and Murali Sitaraman (eds.), *Foundations of Component-Based Systems*, Cambridge Univeristy Press, 2000, 22 pages.

* cited by examiner

```
302 class Hashtable$Contract extends Hashtable
304   constraint
306     let indices = {0..keys.Length - 1}
308     keys != null and values != null and
310     keys.Length = values.Length and
312     (forall i in indices holds keys[i] != null ) and
314     (forall i , j in indices holds keys[i] = keys[j] => i = j )
318   Object set (Object key, Object value)
319     ensure
320         (key = null and thrown is ArgumentNullException) or
322         (exists i in {0..keys'.Length - 1} holds keys[i]' = key and
324         values[i]' = value and
326         result = value)
```

```
402 class Hashtable$Checked : IDictionary {
404     void Hashtable$Invariant() {
405             ASSERT([[constraint clause from Fig. 3]]);
406     }
407     void set$Pre (Object key, Object val) { ASSERT(true); }
408     void set$Post (Object key, Object value, Object result) {
410             ASSERT([[ensure clause from Fig. 3]]);
412     }
414     Object[ ] keys; Object[ ] values;
418     Object set (Object key, Object value) {
420             Object result ;
422             Hashtable$Invariant();
424             set$Pre(key, value);
426             try {
428                     [[body of the set method from the implementation code]]
432                     <return value / result = value; break END;>
434             } catch (Exception e) {
436                     result = e;
438             }
440     END :
444             Hashtable$Invariant();
446             set$Post(key, value, result );
448             if (result is Exception) throw result ; else return result ;
450 }}
```

```
502 class IDictionary$Contract implements IDictionary
504    var map as Map of Object to Object
506    constraint null notin domain(map)
510    Object set (Object key, Object value)
511        ensure
512            (key = null and thrown is ArgumentNullException) or
514            (map(key)' = value and result = value)
```

FIG. 5

```
604    Hashtable::abstraction () as IDictionary$Contract {
606        return new IDictionary$Contract(
608            {keys(i) |-> values(i) |  i in {0..keys.Length - 1} where keys(i) != null} ); }
```

FIG. 6

```
702 class IDictionary$Contract implements IDictionary
704   var map as Map of Object to Object
706   var enums as Set of IEnumerator
708   constraint null notin domain(map) and null notin enums
712   Object set (Object key, Object value)
714     step if key = null
716             throw new ArgumentNullException()
718          map(key) := value
720     step forall e in enums
722             e.Invalidate()
724     step return map(key)
```

```
802 class IDictionary$Contract {
804     AsmL.Map map = new AsmL.Map();
806     AsmL.Set enums = new AsmL.Set();
808     void set$Pre (Object key, Object val) { ASSERT(true); }
810     void set$Post (Object key, Object val, Object result) {
812         try {
814             [[body of the specification of the the set method of Fig. 7]]
815             <return e / ASSERT(result == e); return; >
816         } catch (Exception e) {
818             ASSERT(result.GetType() == e.GetType());} } }
```

```
902 class Hashtable$Checked : IDictionary {
904   IDictionary$Contract contract = new IDictionary$Contract();
906   Object[] keys; Object values[];
908   Object set(Object key, Object value) {
910      Object result;
912      contract.Invariant();
914      contract.set$Pre(key,value);
916      try {
918         [[body of the set method from the implementation code]]
920         <return e / result = e; break END; >
922      } catch (Exception ex) { result = ex;}
924      END:
926      contract.set$Post(key,value,result);
928      contract.Invariant();
930      if ( result is Exception ) throw result; else return result; } }
```

1000

```
1002 class Hashtable$Checked : IDictionary {
1004    IDictionary$Contract contract;
1006    IDictionary$Contract initialization() { . . . }
1008    Hashtable(. . .) {
1009       //initialize implementation variables here...
1010       contract = initialization(); }}
```

FIG. 10

1102 set (Object key, Object value)
1104　if key = null
1106　　　　throw ArgumentNullException
1108　map(key) := value
1110　if key in domain(map)
1112　　　　choose r in { map(key), value }
1114　　　　　　return r
1115　　　　ifnone
1116　　　　　　throw new RuntimeException()
1116　else
1118　　　　return value

1100

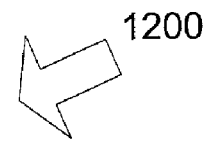

```
1202  class IDictionary$Contract {
1204    AsmL.Map map = new AsmL.Map();
1206    AsmL.Set enums = new AsmL.Set();
1208    IDictionary$Contract$Set setInstance;
1210    void set$Pre(Object key, Object value) {
1212      setInstance = new IDictionary$Contract$Set(key,value);
1214      ASSERT(true);
1216      setInstance.Step(); }
1220    void set$Post(Object key, Object value, Object result) {
1222      setInstance.impl_result = result;
1224      ASSERT(true);
1226      setInstance.pc = END;
1228      setInstance.Step(); }
```

FIG. 12

```
1232  class IDictionary$Contract$Set : ISteppable, IDictionary$Contract {
1234      Object key;
1236      Object value;
1238      Object result;
1240      Object impl_result;
1242      int pc;
1244      void Step();
1246      IDictionary$Contract$Set(Object k, Object v) {
1248          key = k; value = v; pc = 0; }
```

```
1250 void IDictionary$Contract$Set::Step() {
1252    while (true) {
1254       switch (pc) {
1256          case 0: Stack.Push(new EmptyFrame()); pc += 1; break;
1258          case 1: try {
1260             if (key == null )
1262                throw new ArgumentNullException();
1264             map(key) = value;
1266             if ( Stack.NoOfCalls() > 0 ) {
1268                pc += 1; return; }
1270             pc += 3; break;
1272          } catch (Exception ex) {
1274             result = ex; pc = END; return; }
1276          case 2: ASSERT([[constraint from Figure 7]] && true);pc += 1; return;
1278          case 3: if (Stack.NoOfCalls() > 0) { pc -= 1; return; }
1280             pc += 1; break;
```

FIG. 14

```
1282    case 4: try {
1286        foreach(IEnumerator e; enums)
1288            Stack.Add(new Call(this,e,Invalidate,null))    ⬅ 1500
1290        [[repeat lines 1266-1274]]
1292    case 5: ASSERT([[constraint from Figure 7]] && map(key) == value);
1294        pc += 1; return;
1296    case 6: [[repeat lines 1278-1280]]
```

FIG. 15

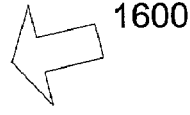

```
1298    case 7: try { result = map(key);
1300        if ( Stack.NoOfCalls() > 0 ) {pc += 1; return; }
1302        pc = END; return;
1304    } catch (Exception ex) {
1306        result = ex; pc = END; return; }
1308    case 8:
1310        ASSERT([[constraint from Figure 7]] && map(key) == value);
1312        pc += 1; return;
1314    case 9: if (Stack.NoOfCalls() > 0) {pc -= 1; return; }
1316        pc = END; return;
1318    case END:
1320        ASSERT(Stack.NoOfCalls() == 0);
1322        ASSERT(result is Exception ?
1324            result.GetType() == impl_result.GetType() :
1326            result == impl_result);
1328        Stack.Pop();
1330        return;   } } }
```

FIG. 16

```
1350 Invalidate() {
1352    Object result;
1354    Call c = Stack.SelectCall(this, "Invalidate", null);
1356    if (c != null) c.Caller.Step();
1358    try { valid := false } catch (Exception ex) { result = ex; }
1362    if (c != null) { Stack.Remove(c); c.Caller.Step(); }
1364    if ( result is Exception ) throw result; else return; }
```

FIG. 17

CONFORMANCE EXECUTION OF NON-DETERMINISTIC SPECIFICATIONS FOR COMPONENTS

TECHNICAL FIELD

The invention relates to testing program code, and more particularly to verifying the execution of program code in conformance with a behavioral specification.

BACKGROUND

One of the most important and challenging aspects of software development is testing. Testing involves determining whether software executes in a manner consistent with the software's intended behavior. The software's intended behavior may be defined using an executable specification language such as the Abstract State Machine Language (AsmL). AsmL may be employed to specify precise conforming behavior (a deterministic specification), or to specify ranges or choices within which various acceptable behaviors may take place (a non-deterministic specification). Non-deterministic specifications are desirable because they do not specify the implementation behavior down to the finest detail. Non-deterministic specifications define choices for behavior, allowing the software implementer design freedom within those choices. An AsmL specification may be executed by itself (in a stand-alone manner) or in conjunction with a separate implementation in order to ascertain whether or not the behavior defined by the specification is in fact the desired behavior.

A software implementation's runtime behavior may be compared against the specified behavior to identify non-conformities. This process is referred to as conformance testing. One approach to conformance testing is to insert code into the software to test conditions. The conditions define the desired state of the software at method boundaries of the software. For examples of this approach, see Bertrand Meyer, *Eiffel: The Language,* Object Oriented Series, Prentice Hall, New York, N.Y., 1992. See also the White Paper by Murat Karaorman et al. of Texas Instruments et al., entitled *jContractor: A Reflective Java Library to Support Design By Contract,* and the White Paper by Reto Kramer of Cambridge Technology Partners, entitled *iContract—The Java Design by Contract Tool.*

A limitation of existing methods of conformance testing is that they do not provide adequate support for non-deterministic specifications. Another limitation of existing methods is that they do not adequately address the conformance checking of call sequences. A software specification may indicate that processing within a method of an implementing class should proceed in steps, e.g. in a particular order. The specification may also indicate that the implementation method must make calls to methods of another class (so called 'mandatory calls'). The mandatory calls may lead to re-entrance of methods of the implementing class, resulting in unpredictable state changes while the mandatory calls are still pending. Existing approaches to conformance checking do not adequately address this situation.

SUMMARY

To perform conformance checking of a software implementation with a nondeterministic specification, a software implementation and a software specification are applied to produce a conformance-test (CT) enabled implementation. Nondeterministic choices of the software specification result in assigning a corresponding choice of the CT enabled implementation to a variable. The CT enabled implementation includes a test that the variable then comprises one of the nondeterministic choices allowed by the software specification.

To perform conformance testing where the software specification includes ordered steps, and calls to methods of other classes (mandatory calls), a software object is produced and organized such that each step of the software specification has a corresponding code section in the software object. The software object includes instructions to generate an identification of a mandatory call comprised by the software specification, and instructions to test that the state of the implementation conforms to the software specification during the mandatory call.

DRAWINGS

FIG. 3 is an embodiment of an AsmL code listing of an implementation-specific declarative software specification.

FIG. 4 is an embodiment of a C# code listing of a conformance-test enabled implementation for the specification of FIG. 3.

FIG. 5 is an embodiment of an AsmL code listing of a declarative interface specification.

FIG. 6 is an embodiment of a C# code listing to synchronize variables of an implementation and the specification of FIG. 5.

FIGS. 8 and 9 are embodiments of C# code listings of a conformance-test enabled implementation for conformance testing with the specification of FIG. 7.

FIG. 10 is an embodiment of a C# code listing to synchronize variables of an implementation and the specification of FIG. 7.

FIG. 12 is an embodiment of a C# code listing of a conformance-test enabled implementation for conformance testing with steps and mandatory calls of the software specification of FIG. 7.

FIGS. 14–16 are an embodiment of a C# code listing of a method of the class of FIG. 13 for conformance testing with steps and mandatory calls of the software specification of FIG. 7.

FIG. 17 is an embodiment of a C# code listing of the target of a mandatory call method to assist conformance checking with the specification of FIG. 7.

DESCRIPTION

In the following figures and description, like numbers refer to like elements. References to "one embodiment" or "an embodiment" do not necessarily refer to the same embodiment, although they may.

A software implementation in the form of a class definition may be compiled into an intermediate language (IL)

form. Likewise, a specification corresponding to the software implementation may be compiled into an IL form. The IL forms of the implementation and the specification may be applied to produce a conformance-tested IL form of the implementation that may be executed in a run-time environment. Simply executing the conformance-tested IL produces an error, assertion, or other indication when the implementation does not conform to the specification.

Figure 1:
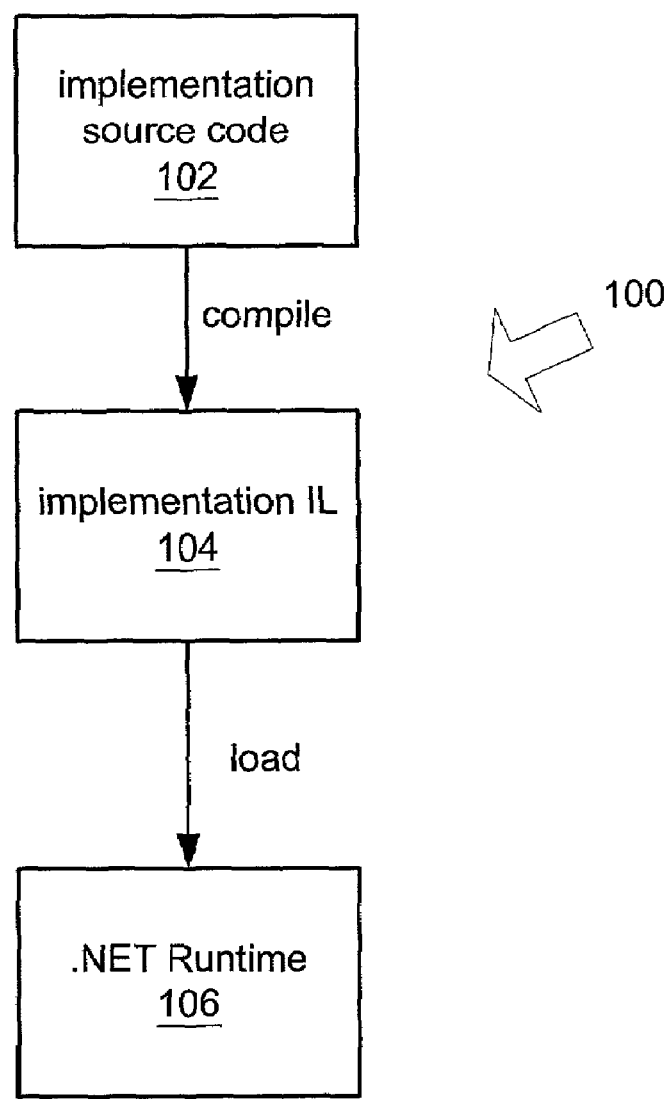
FIG. 1 is a block diagram of a system embodiment of an execution environment.

With reference to the system embodiment 100 of FIG. 1, software source code 102 is compiled into an "intermediate language" (IL) form 104 before being loaded into a runtime environment 106. The IL form 104 may be referred to as the implementation IL. The source code 102 is typically a high-level programming language form such as C++, C# (pronounced C sharp), Visual Basic, and so on. The implementation IL 104 includes platform-neutral instructions that may be executed by a virtual machine (VM) of the runtime environment 106. Platform neutral instructions are instructions that are not specific to a particular hardware processor or hardware configuration. One example of an intermediate language is the Microsoft Intermediate Language (MSIL). The VM of the runtime environment 106 abstracts the underlying hardware platform to provide a platform-neutral environment for executing the implementation IL 104. In addition to the VM, the runtime environment 106 may include I/O facilities and garbage collection, among other things. The Microsoft.NET Runtime Environment is an example of a runtime environment 106 that supports the execution of MSIL.

The software specification and the software implementation can be in any languages. The languages of the specification and implementation need not be the same. In one embodiment, the specification is in the Abstract State Machine Language (AsmL), although this need not be the case. Once the specification and implementation are compiled to a common IL, portions of code from both may be applied to produce the conformance-test enabled implementation code. Producing and executing a single body of code alleviates difficulties that arise from separately executing the implementation IL and the specification IL and then attempting to compare the results of the separate executions.

Figure 2:
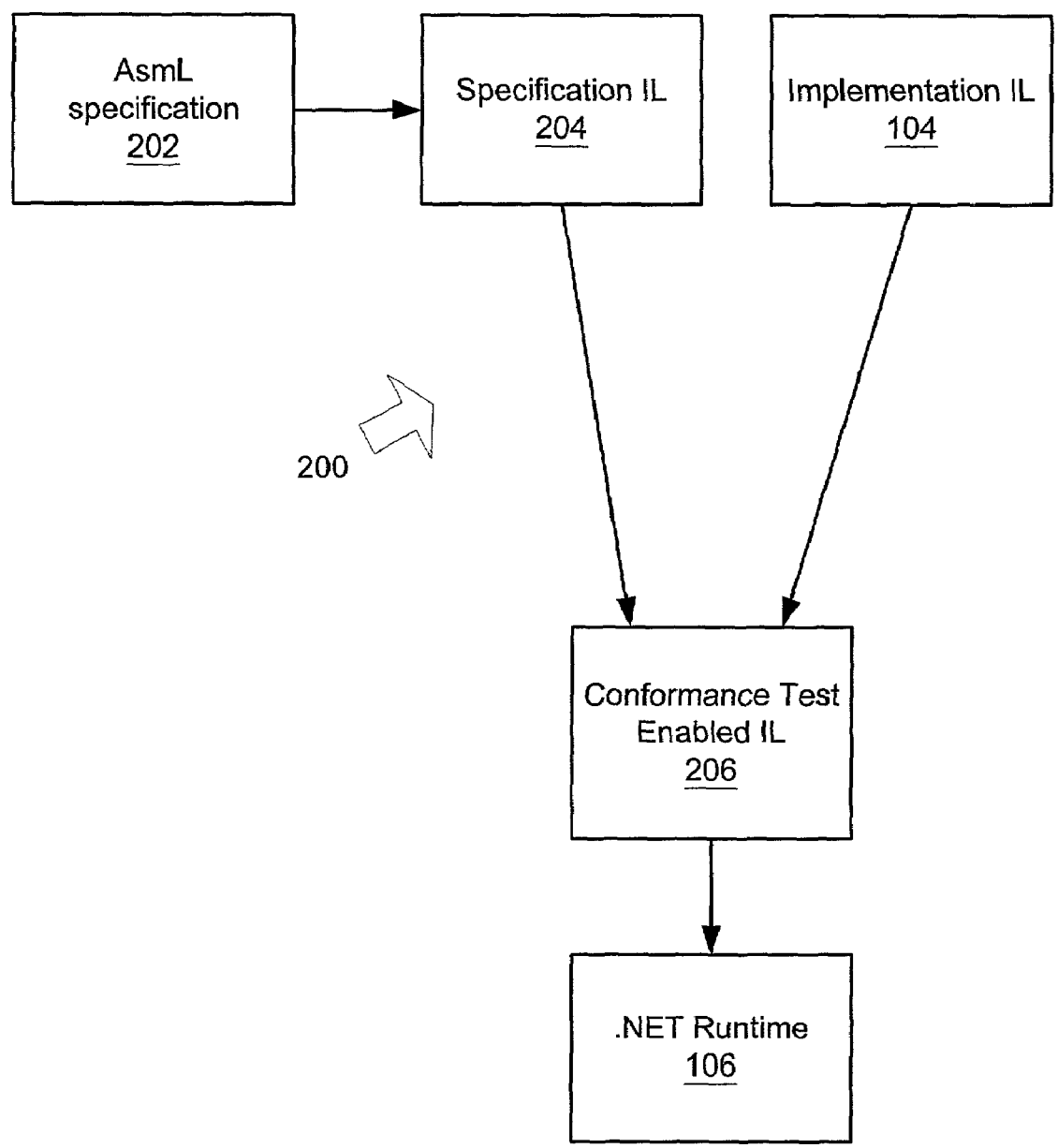
FIG. 2 is a block diagram of a system embodiment to perform software conformance testing.

With reference to the system embodiment 200 of FIG. 2, an AsmL software specification 202 is compiled to an intermediate language form 204, which may be referred to as the specification IL. The specification IL 204 is applied to the implementation IL 104 to produce a conformance test enabled intermediate language form 206 (CT enabled IL form). The CT enabled IL form 206 may be loaded and executed by the runtime environment 106 to conformance test the behavior of the implementation IL 104 with the behavior defined by the specification 202.

Broadly, two types of specifications are possible. One type of specification is declarative. A declarative specification specifies the behavior of an implementation in terms of logical conditions that must prevail at different points during the execution of the implementation. Another type of specification is operational. An operational specification defines the behavior of an implementation in terms of actions that the implementation should take. Both types of specifications can be specific to a particular implementation class, or more general so that they apply to any class that implements one or more specified methods. The latter is referred to herein as an interface specification. Interface specifications may be reused with different implementation classes, but they tend to be more abstract and hence somewhat more complex than implementation-specific specifications. FIG. 3 illustrates an embodiment of a declarative specification that is specific to a particular implementation class, and FIG. 4 illustrates an embodiment of a corresponding CT enabled implementation class. FIG. 5 illustrates an embodiment of a declarative interface specification, i.e., a declarative specification that is not specific to a particular implementation class. FIG. 6 illustrates additional (beyond what is found in FIG. 4) "abstraction" code required by a CT enabled implementation class for the declarative interface specification of FIG. 5.

FIG. 3 is a code listing embodiment for the specification of a hash table. A hash table is data and associated methods to associate unique keys with values. One way to implement a hash table is using two arrays; the first array holds the keys, and the second array holds the values associated with the keys. FIG. 3 is a code listing of an embodiment 300 of a class to specify the behavior of a hash table implementation.

An AsmL specification for a hash table begins with the class declaration 302. The declaration 302 inherits from the implementation class (Hashtable). In other words, the specification inherits from the implementation for which it is a specification. This situation provides the specification with access to all of the protected state (member) variables of the implementation. Public member variables are accessible from any class, and private member variables are not accessible from any other class. Protected member variables are accessible to classes derived from the class, but not to unrelated classes.

Lines 304–314 specify a 'constraint'. A constraint is a state condition that must be true for the implementation class at all times in order to avoid an error situation. In this case, the constraint indicates that at all times:

The arrays that hold the keys and values of the Hashtable implementation class should have the same length and should not be null.

No key should have a value that is null.

No two keys in the key array should be identical.

Lines 319 to 326 specify an 'ensure' condition for the set( ) method of the Hashtable class. The set( ) method sets (associates) a key-value pair in the hash table. To comply with the specification, the ensure condition must hold true at the conclusion of the implementation's set( ) method. In this case, the ensure condition specifies:

If the key provided to the method call is null, the method throws an ArgumentNullException.

The keys and values in corresponding positions of the arrays are set to the key and value provided in the method call.

The return value of the method should be the value provided in the method call.

Conditions that must hold upon entry to a method are specified with a 'require' clause. The specification 300 does not comprise any require clauses. The specification 300 is an example of a declarative specification. The desired behavior of the implementation is specified in terms of the conditions that must be met at all times (constraint clauses), conditions that must be met when a method is entered (require clauses), and conditions that must be met when a method is about to return (ensure clauses).

With reference to FIG. 4, the specification code 300 and the implementation code are applied to produce conformance-test enabled code 400 (CT enabled code). The CT enabled code is a body of code that executes the implementation and in the process tests the implementation for conformance with the specification. When the implementation does not conform to the specification, an error arises. The error may be provided by well-known techniques such as assertions, indicated in the figures by ASSERT. Other techniques for reporting errors, such as log files, could also be used. For simplicity, the CT enable code 400 is illustrated as high-level source and pseudo-code. In one embodiment, the CT enabled code 400 is produced in MSIL. Language within double brackets [[ ]] identifies code to be inserted. Language within angle brackets < > identifies a substitution of new code for existing code. The substitution is identified as follows: old/new, where 'old' is the code to replace, and new is the code that replaces it.

The class declaration 402 implements an interface called IDictionary. The IDictionary interface may specify general methods for acting upon a 'dictionary', i.e., a collection of key-value pairs. A hash table is a specific implementation of a dictionary.

Line 406 defines the Hashtable$Invariant( ) method that enforces the constraint condition of the specification code 300. Whenever the method Hashtable$Invariant( ) is called, it checks that the constraint condition is satisfied and cause an error (by way of an assertion) otherwise.

Line 407 defines the set$Pre( ) method that implements any specified require clause. No require clause was specified, and so the Set$Pre( ) method, when called, simply asserts true (i.e., it never causes an error).

Lines 408–412 define the set$Post( ) method that enforces the specified ensure clause. The set$Post( ) checks (by way of an assertion) that the ensure condition is satisfied and causes an error otherwise.

Line 414 declares the key and value arrays for the hash table implementation. Lines 418–450 implement the set( ) method of the implementation, with conformance checking. A return object is declared at 420, and at line 422, the Hashtable$Invariant( ) method is called to check the constraint condition (which must always hold within the method). At 424 the set$Pre( ) method is called. If a require condition is specified, the require condition is enforced by this call.

Lines 426–438 define a try-catch construct for exception handling. The body of the try clause (lines 428–432) is executed, and if an exception results, control is transferred to the catch clause (lines 434–438). When an exception takes place, line 436 assigns the exception to a variable. The body of the set( ) method from the implementation is inserted at 428. Line 432 indicates that all return statements in the body of the set method from the implementation are replaced with the following code:

result=value; break END

In other words, instead of returning the value that was set, the method now assigns the value to a variable and jumps to line 440, which is labeled END. At line 440, the variable result either contains the return value assigned in the try clause, or the exception assigned in the catch clause. At 444 the Hashtable$Invariant( ) method is called to enforce the constraint condition before the method returns. At 446 the set$Post( ) method is called to enforce the ensure condition. If the ensure condition is not satisfied, set$Post( ) causes an error.

At line 448, the result variable is checked to determine whether it holds an exception or a return value. If result holds an exception, the exception is thrown. Otherwise, the result is returned. (In this embodiment, it is assumed that no exception type is ever returned as a normal result.)

One limitation of the specification 300 of FIG. 3 is that it is specific to the Hashtable implementation class, and in fact extends the implementation class. A more 'abstract' specification that defines the behavior of implementations independently of a particular class definition could be applied to any implementing class. One manner of specifying behavior independently of the implementation is to avoid the use of specific implementation variables in the specification. (The specification 300 of FIG. 3 was specific to the Hashtable class because it inherited from and employed class variables of Hashtable). With reference to the code listing embodiment 500 of FIG. 5, a specification that is independent of a particular implementation class begins at 502 with a class declaration. The class IDictionary$Contract specifies the IDictionary interface. At 504 a map object is declared. The map object associates values or objects with corresponding values or objects in a one-to-one fashion. Lines 512 to 514 define an ensure condition for the set method of any class that implements the IDictionary interface. Unlike the specification 300 of FIG. 3, the ensure condition of FIG. 5 is not defined in terms of particular implementation variables. Instead, the ensure condition is specified in terms of the specification map variable:

If the key provided to the method is null, the method throws an ArgumentNullException.

The updated map should associate the provided key with the provided value, and the method should return the provided value.

The conditions of the specification are defined in terms of the map variable. However, implementations do not use this variable, but instead use variables typically chosen to optimize some implementation constraint, such as processing speed or memory size. In order to synchronize the use of specification variables in the specification, and implementation variables in the implementation, an implementation constructs an instance of the specification class IDictionary$Contract. The specification class is constructed using implementation variables. With reference to the code listing embodiment 600 of FIG. 6, at 604 to 608 an implementation class may define a method called abstraction( ) to construct, initialize, and return an instance of the IDictionary$Contract class. The IDictionary$Contract instance comprises specification variables initialized from the implementation variables. Of course, the method to create the specification class instance could have any name which does not conflict with other method names of the implementation. At lines 606–608, the abstraction( ) method constructs and initializes a new instance of IDictionary$Contract using a map-comprehension expression. The map-comprehension expression is defined in terms of the implementation array variables, 'keys' and 'values'. The map-comprehension expression defines a mapping between corresponding positions of the arrays. The map comprehension expression defines a map object and is used by the IDictionary$Contract constructor to initialize the map specification variable. In this manner, a correspondence is established between the implementation and specification variables. By providing a method such as abstraction( ) in the implementation, the specification may be made independent of any particular implementation.

In addition to initialization, it may be advantageous to create and initialize an instance of the specification class immediately prior to invoking any methods of the specification class. This "just-in-time" instantiation enables the state of the implementation to remain synchronized with the state of the specification, regardless of intervening (unspecified) methods or other processing that may alter the state of the implementation in unpredictable ways.

FIGS. 3–6 involve declarative specifications. As previously described, another type of specification is operational. An operational specification defines a behavior in terms of actions that should be taken. FIGS. 7–10 illustrate an operational specification and its use in conformance testing.

Figure 7:
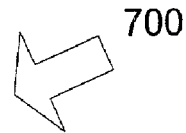
FIG. 7 is an embodiment of an AsmL code listing of an operational software specification.

With reference to the code listing embodiment 700 of FIG. 7, an AsmL operational specification of the IDictionary interface begins with a class declaration 702. The specification 700 declares a map object (line 704) and a set of enumeration objects (line 706). An enumeration object comprises data and methods to enable the enumeration of a set, item by item. A client of the IDictionary interface may receive an enumeration object and employ the object to enumerate the contents of the map object. Line 708 defines an overall constraint condition. This constraint is outside of any method specification and hence is to be applied to all methods of the interface. The constraint specifies that the domain of the map and the set of enumerators cannot comprise any nulls.

Lines 712–724 specify operations that implementations of the set method should perform. Conformance checking is performed by executing the operations of the specification along with the operations of the implementation, and checking the two results with one another. An error occurs if the results don't match.

Lines 714–718 define a first step in the operation of the specification of the set method. A step is a block of operations that occur in parallel. No updates to the state of the specification occur until all operations of a step are complete. In the first step at 716, if the provided key is null, an exception is thrown. Otherwise, at 718 the provided key is associated with the provided value in the map.

Lines 720–722 define a next step in the operation of the specification of the set method. All enumerators are invalidated (e.g. marked as unreliable or useless). The enumerators are invalidated because each enumerator comprises a current location in the map that determines which positions of the map have already been enumerated, and which positions are yet to be enumerated. When the map is altered in mid-enumeration, the enumerator loses its context and must be invalidated.

Line 724 defines a next step in the operation of the set method. The provided value that was associated with the key in the map is returned.

In one embodiment, a new class may be generated embodying operations of the specification. An object instance of this new class may be invoked at strategic points during the execution of the CT-enabled implementation. In this manner, the operations of the implementation and the specification may be executed together, and the results compared, so that the implementation may be checked for conformance with the operational behavior of the specification.

Figure 8:

With reference to the code listing embodiment 800 of FIG. 8, a class generated to carry out the operations of the specification begins with a class declaration 802. At lines 804–806, an AsmL 'map' object and an AsmL 'set' object are declared in the generated class. The map object associates values or objects with corresponding values or objects in a one-to-one fashion. The set object defines a collection of objects. Although the class is illustrated in C# and pseudocode for simplicity, in one embodiment the class is generated in an intermediate language.

At 808 a set$Pre( ) method is defined to assert any require conditions (none were present in the specification). At lines 810–818 a method set$Post( ) is defined to include the operations from the specification of the set method. Any return statements are replaced with an assertion that the result of executing the specification code matches the result provided from the implementation (i.e., ASSERT (result==e)). If the execution of the specification code results in an exception, the exception is checked against the result provided by the implementation at line 818. The type of both exceptions should be compatible.

With reference to the code listing embodiment 900 of FIG. 9, an implementation class with conformance checking begins with a class declaration 902. At 904, the implementation instantiates the IDictionary$Contract class which implements the operational specification 700. At 906 the implementation variables for the hash table arrays are declared. The set( ) method of the implementation is declared at 908, along with a return variable at 910. At 912 the Invariant( ) method of the specification object is invoked to enforce any constraints. The set$Pre( ) method of the specification object is called at 914 to enforce any preconditions. The body of the implementation of the set method is executed inside a try-catch construct at 916–920. Line 920 indicates that any return statements in the implementation body have been replaced with an assignment of the method result to a variable and a jump to line 924. If there was an exception, the catch clause traps it and assigns the exception to the result variable. At 926 set$Post( ) is called with the result of executing the implementation. The specification code is executed in set$Post( ) and the results of executing the implementation and the specification are compared. An exception is asserted if the two results don't match. Otherwise, set$Post( ) returns, and at 928 the constraint condition is enforced again. Finally at 930, the result of executing the implementation is performed; either the result is returned, or if execution resulted in an exception, the exception is thrown.

To reach a common result, the implementation and the specification may need to begin executing from a common starting state. The implementation may provide an initialization method to construct the specification object with the proper starting state. With reference to the code listing embodiment 1000 of FIG. 10, the implementation class 1002–1010 comprises a specification object at 1004. FIG. 10 contains additional definitions for the class defined in FIG. 9. At 1006 an initialization method is defined to set the specification object with the proper starting state. A constructor 1008–1010 of the implementation class calls the initialization method to properly initialize the specification object.

For the same reasons set forth in the discussion of declarative specifications, it may be advantageous to instantiate the operational specification class (or at least, to resynchronize the state of the implementation and the specification object) immediately prior to invoking any methods of the specification object.

Another challenge in conformance testing arises when there is non-determinism in the specification. As previously described, non-deterministic specifications define ranges or choices within which various acceptable behaviors may take place. Non-deterministic specifications are desirable because they do not specify the implementation behavior down to the finest detail. Non-deterministic specifications define choices for behavior, providing the software implementer with design freedom within those choices.

Figure 11:
FIG. 11 is an embodiment of an AsmL code listing of a nondeterministic operational software specification.

With reference to the code listing embodiment 1100 of FIG. 11, an alternative specification for the set( ) method 1102–1118 includes a nondeterministic choice 1112. (Compare this specification with the one in FIG. 7.) If the provided key exists already in the map, the specification allows the implementation to choose to return either the provided value, or the existing value in the map corresponding to the provided key. If the choice fails for some reason, lines 1115–1116 provide a runtime exception. The choice will always succeeds in the specification; it can however fail in the CT enabled implementation.

Where, as here, the value being non-deterministically chosen is also the return value of the method, a general code pattern can be provided to enable conformance checking of an implementation with the nondeterministic specification. The pattern:

```
choose x in S where p(x)
    R(x)
ifnone
    Q
leads to the following conformance-checking code
    let x = result
    if x in S and p(x)
        R(x)
    else
        Q
```

Here, p(x) is a condition which the specification defines and which the nondeterministic choice must meet. In other words, "choose x in S where p(x)" means, "make a choice x from the set S, where x satisfies the condition p(x)". The symbols R(x) represent at least one operations to perform if a conforming choice can be found in the set S. The symbol Q represents at least one operation to perform if a conforming choice can not be found in the set S. Either of R(x) and Q(x) could be null (no operations to perform if the choice succeeds or fails, respectively) or "no ops", meaning that the operations are merely placeholders with no real effect on execution. With reference again to FIG. 11, the following code tests for conformance with lines 1112–1116 (the non-deterministic choice) of the specification:

```
let r = result
if r in {map(key), value}
    return r
else
    throw new RuntimeException( )
```

The return result of the implementation method is placed into a variable r, as in FIG. 4. A test is made to determine if the return result is one of the new value set in the map, or the old map value. If so, the result is returned from the method. Otherwise, the exception is thrown. Thus, the implementation method is tested for conformance with the non-deterministic specification. Note that in this embodiment the implementation is executed first, so that the return result of the implementation is available to test against the specification.

In another embodiment, instead of placing the return result of the method into the variable r, the implementation provides a method to return any non-deterministically chosen value into the variable r.

Another challenge is the conformance checking of execution steps and calls to methods outside of the class to test. Consider a specification in which a method must perform processing and make calls to other methods in a certain order. The called methods, in turn, may call back into methods of the class that provides the calling method. This situation can lead to re-entrance of the class in manners that change the state of the calling method in unpredictable ways.

To handle this situation, the specification code can be divided into steps. Each section corresponds to a set of operations which can occur concurrently. The steps themselves are ordered, i.e., are specified to occur in a certain sequence. For example, each of the three steps of the specification code listing 700 of FIG. 7 may comprise a separate section of a conformance-test enabled object. Herein, the term 'section' refers to one or more instructions which can be executed independently of the instructions of other sections. Sections may be delimited by conditional statements such as if-then statements, case statements, go-to statements, or other control-flow control techniques. Sections may also be encapsulated into methods, functions, etc. A sequencing variable may be employed to execute the sections in an order corresponding to the order of the corresponding steps in the specification.

A new class embodying the sections may check that the operations of the implementation are carried out in the proper sequence, that the implementation makes mandatory calls as specified, and that the state of the implementation state remains in conformance with the specification.

If calls to methods in other classes (henceforth, 'mandatory calls') are indicated in the specification, a check is made to confirm that those calls are made by the implementation. A check is made during each mandatory call to confirm that the state of the implementation remains in conformance with the specification. In one embodiment, a new class is generated to handle these tasks. (In the examples herein, this new class is a subclass of IDictionary$Contract from FIG. 8.) There is one subclass defined per method for which there is a specification. Thus, in the examples herein a single subclass called IDictionary$Contract$Set is generated. All subclasses share a common runtime stack, embodied by the object Stack in the code listing embodiment 1200 of FIG. 12. The code 1200 shows a CT enabled implementation 1202–1228 of the specification of FIG. 7. An instance of the IDictionary$Contract$Set subclass is generated at 1212. The subclass includes a method, Step( ) (illustrated fully in FIGS. 14–16), which performs the following tasks:

Executes steps of the specification in sections, in the proper order.

Checks that the implementation made the mandatory calls that were indicated in the specification.

During each mandatory call, checks that the implementation state remains in conformance with the specification.

In situations where the method under conformance test (in this example, the set method) may be reentered, a stack of instances of the subclass may be maintained by the CT enabled implementation (in this example, IDictionary$Contract). Instead of storing a single instance of IDictionary$Contract$Set in an instance variable, the set$Pre method of IDictionary$Contract may create a new instance of IDictionary$Contract$Set at 1212 and push it onto a stack of such instances (called, for example, setInstanceStack). All references to the subclass in FIG. 12 would then be made into references to the instance of the subclass on the top of the stack. Thus, for example, the call to "setInstance.Step( )" at lines 1216 and 1228 would become "setInstanceStack.top.Step( )". The set$Post method would pop the instance of the subclass from the top of the stack before returning.

In one embodiment, a call to the Step( ) method is included in the CT enabled implementation class as part of the methods set$Pre( ) and set$Post.

Figure 13:
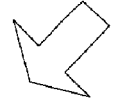
FIG. 13 is an embodiment of a C# code listing of a class for conformance testing with steps and mandatory calls of the software specification of FIG. 7.

FIG. 13 shows a code list embodiment 1232–1248 of a subclass to conformance test the set method of the IDictionary$Contract class of FIG. 12. The subclass contains a member variable, pc (for program counter), which controls the sequence of execution of the sections of Step( ) corresponding to the specified steps of the set method. The class also contains a member variable corresponding to each parameter of set. These member variables retain their values across separate invocations of Step( ). These member variables (key, value) are set by the constructor 1246–1248 of the IDictionary$Contract subclass, and the program counter is initialized to zero.

With reference to the code listing embodiment 1400 of FIG. 14, the Step( ) method is declared 1250 and includes an outer execution loop 1252. The first time Step( ) is called (by set$Pre( )), pc is zero and thus the switch 1254 chooses case 0 at line 1256. A new "stack frame" is created and pushed onto the stack. The program counter is incremented, and the outer loop 1252 executes a switch 1254 to case 1 at line 1258. Instructions 1260–1264 correspond to the first step of the specification 700. A test at 1266 determines if the first step pushed mandatory calls on the stack (the mandatory call itself is not pushed—rather, an identification of the call is pushed, as described further in conjunction with FIG. 15). If the first step made mandatory calls, the program counter is incremented and Step( ) returns. Otherwise, the program counter is incremented by three to execute the instructions corresponding to the second step of the specification. Any exceptions in the first step cause the sequence variable pc to be set to the value END (indicating an end to execution of the specification sections) before Step( ) returns.

In this example, the first step of the specification does not specify any mandatory calls. Thus, lines 1276–1280 (where the program counter has the values 2 or 3) are not executed. Execution skips to the second section of the code (case 4), corresponding to instructions of the second step of the specification.

With reference to the code listing embodiment 1500 of FIG. 15, the second section of the code (lines 1282–1288) stores at 1288 an identification of each mandatory call that the specification indicates the implementation should make. Lines 1286 indicate that a mandatory call should be made to the Invalidate( ) method of each outstanding enumeration object (refer back to the description of FIG. 7 for the purpose and function of enumerator objects). Each specified mandatory call results in the addition of a "call signature" to the current stack frame. It does not push any new elements on the stack, but instead adds information to the frame that is on the top of the stack. A call signature includes 1) the identity of the object which comprises the Step( ) method, 2) the identity of the object on which the mandatory call is invoked, 3) the name of the mandatory call, 4) the values of any parameters to the mandatory call (in this case, null is passed because the Invalidate( ) method has no parameters). Other embodiments might comprise other information to uniquely identify each call. Because the stack frame now includes the signatures of mandatory calls, pc is incremented by one (1) and control is returned to the conformance tested implementation (see lines 1266–1274). To conform to the specification, the CT enabled implementation must now execute the mandatory calls identified in the stack frame. Referring to the code listing embodiment 1700 of FIG. 17, the software comprising the mandatory call (lines 1350–1364) is adapted to:

Locate the signature of particular invocation of the mandatory call in the stack frame (line 1354).

Call Step( ) a first time on the sub-class instance corresponding to the method that invoked the mandatory call (line 1356).

Call Step( ) a second time on the sub-class instance corresponding to the method that invoked the mandatory call (line 1362).

Remove the call signature from the stack frame (line 1362).

Referring back to FIG. 15, the first call to Step( ) at 1354 results in the execution of lines 1292–1294 (case 5). A check is made to determine that the state of the CT enabled implementation conforms to the specification at the time of the mandatory call. In addition to testing the constraint condition, the "strongest post-condition" of the prior step of the specification is also tested. The strongest post-condition may be determined in manners well known in the art, and in this case comprises the condition "map(key)==value". The variable pc is then incremented so that the next time Step( ) is called, lines 1296 are executed (case 6). Control is returned to the mandatory call method, which calls Step( ) a second time at 1362 (FIG. 17). During this second call to Step( ), a check is made to determine whether the frame at the top of the stack comprises additional mandatory call signatures (e.g. if the specification step under test specified additional mandatory calls). If so, the sequence variable pc is decremented so that lines 1292–1294 (case 5) are executed again to check the state of the CT enabled implementation the next time the CT enabled implementation makes a mandatory call as part of the same specification step.

To summarize, the CT enabled implementation calls Step( ) upon being invoked and before returning. For each specification step that comprises a mandatory call, Step( ) yields (returns control to the CT enabled implementation) to enable the CT enabled implementation to make the conforming mandatory call (or calls). Step( ) is called twice by the software that implements the mandatory call. The first call confirms that the implementation state conforms to the specification. The second call records the termination of the mandatory call and resets the sequence variable, pc, so that Step( ) tests for additional specified mandatory calls, if any. Thus, in one embodiment the implementation of the mandatory call method plays an active part in the conformance testing of the implementation that calls it.

With reference to the code listing embodiment 1600 of FIG. 16, lines 1298–1316 perform substantially the same purpose for the third step of the specification as lines 1282–1296 performed for the second step of the specification (e.g. confirming mandatory calls by the CT enabled implementation, checking the state of the CT enabled implementation during the mandatory calls, etc.). Once the last mandatory call has been confirmed, the program counter is set to END at 1316. When Step( ) is called a final time by set$Post (see FIG. 12, line 1228), lines 1318–1330 (case END—see FIG. 16) are executed. These lines check that:

There are no mandatory calls unaccounted for and left on the stack (line 1320)

The final result of executing the specification is the same as the result of executing the CT enabled implementation (lines 1324–1326). Note that in this embodiment it is the responsibility of set$Post in the CT enabled implementation to set the result in a manner that it can be accessed from Step( ) (see line 1222 of FIG. 12).

Remove the stack frame for the method under test (line 1328).

Figure 18:
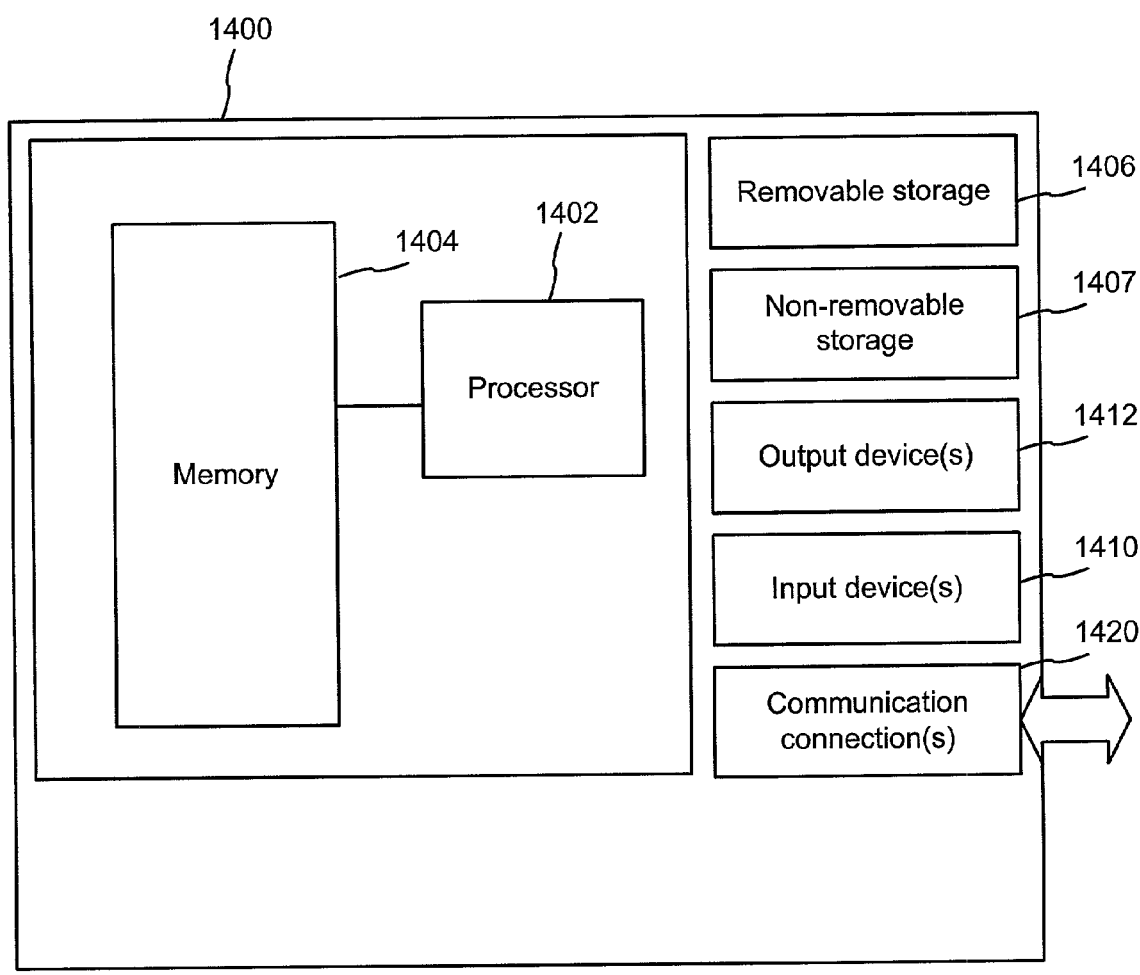
FIG. 18 is a block diagram of an apparatus embodiment to perform conformance checking.

With reference to FIG. 18, an apparatus embodiment 1400 for practicing embodiments of the present invention comprises a processing unit 1402 (e.g., a processor, microprocessor, micro-controller, etc.) and machine-readable media 1404. Depending on the configuration and application (mobile, desktop, server, etc.), the memory 1404 may be volatile (such as RAM), non-volatile (such as ROM, flash memory, etc.) or some combination of the two. By way of example, and not limitation, the machine readable media 1404 may comprise volatile and/or nonvolatile media, removable and/or non-removable media, including: RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information to be accessed by the apparatus 1400. The machine readable media 1404 may be implemented in any method or technology for storage of information such as computer readable instructions, data structures, program modules or other data. Such instructions and data may, when executed by the processor 1402, carry out embodiments of methods in accordance with the present invention.

The apparatus 1400 may comprise additional storage (removable 1406 and/or non-removable 1407) such as magnetic or optical disks or tape. The apparatus 1400 may further comprise input devices 1410 such as a keyboard, pointing device, microphone, etc., and/or output devices 1412 such as display, speaker, and printer. The apparatus 1400 may also typically include network connections 1420 (such as a network adapter) for coupling to other devices, computers, networks, servers, etc. using either wired or wireless signaling media.

The components of the device may be embodied in a distributed computing system. For example, a terminal device may incorporate input and output devices to present only the user interface, whereas processing component of the system are resident elsewhere. Likewise, processing functionality may be distributed across a plurality of processors.

The apparatus may generate and receive machine readable instructions, data structures, program modules or other data in a modulated data signal such as a carrier wave or other transport mechanism. The term "modulated data signal" means a signal that has one or more of its characteristics set or changed in such a manner as to encode information in the signal. This can include both digital, analog, and optical signals. By way of example, and not limitation, communication media includes wired media such as a wired network or direct-wired connection, and wireless media such as acoustic, RF, infrared and other wireless media. Communications media, including combinations of any of the above, should be understood as within the scope of machine readable media.

In view of the many possible embodiments to which the principles of the present invention may be applied, it should be recognized that the detailed embodiments are illustrative only and should not be taken as limiting in scope. Rather, the present invention encompasses all such embodiments as may come within the scope and spirit of the following claims and equivalents thereto.

What is claimed is:

1. A computer-implemented method of conformance-testing a software implementation with a software specification which defines proper behavior of the implementation, the method comprising:
    applying software implementation source code and at least a portion of the software specification to produce a conformance-test enabled implementation comprising portions of the software implementation and portions of the software specification integrated into a same body of code wherein nondeterministic choices of the software specification result in assigning a corresponding choice of the conformance-test enabled implementation to a variable, wherein at least one procedure comprises at least one portion of the software implementation and at least one portion of the software specification, and the conformance-test enabled implementation comprising a test that the variable comprises one of the nondeterministic choices of the software specification;
    compiling the software implementation source code from a first high-level language into an intermediate language;
    compiling the software specification from a second high-level language into the intermediate language; and
    producing the conformance-test enabled implementation in the intermediate language.

2. The computer-implemented method of claim 1 further comprising:
    the conformance-test enabled implementation comprising a test that the variable conforms to a condition on the nondeterministic choice specified in the software specification.

3. The computer-implemented method of claim 1 further comprising:
    the conformance-test enabled implementation comprising at least one first operation to carry out when the variable comprises one of the nondeterministic choices of the software specification; and
    the conformance-test enabled implementation comprising at least one second operation to carry out when the variable does not comprise one of the nondeterministic choices of the software specification.

4. The computer-implemented method of claim 1 wherein applying the software implementation and the software specification to produce a conformance-test enabled implementation further comprises:
    including in the conformance-test enabled implementation instructions of the software implementation to synchronize the state of variables of the software implementation with the state of variables of the software specification.

5. The computer-implemented method of claim 1 wherein applying the software implementation and the software specification to produce a conformance-test enabled implementation further comprises:
    including in the conformance-test enabled implementation instructions of the software implementation to provide the choice of the conformance-test enabled implementation corresponding to the nondeterministic choice of the specification.

6. A computer-implemented method of conformance-testing a software implementation with a software specification, the method comprising:
    producing a software object organized such that a step of the software specification is surrounded by a corresponding code section of the software implementation in the software object, the software object having a class;
    the software object comprising at least one instruction which, when executed by a computer system, causes an identification of a mandatory call comprised by the software specification to be stored in a memory of the computer system; and the software object comprising at least one instruction which, when executed by the computer system, causes a test that the state of a conformance-test enabled implementation conforms to the software specification during the mandatory call;
    wherein the mandatory call comprises a call to at least one method in at least one class different than the class of the software object.

7. The computer-implemented method of claim 6, further comprising:
the conformance-test enabled implementation comprising at least one instruction which, when executed by the computer system, causes a section of the software object to be executed prior to the conformance-test enabled implementation performing the mandatory call, the section of the software object to be executed corresponding to a step of the software specification comprising the mandatory call.

8. The computer-implemented method of claim 6 further comprising:
modifying the software comprising the mandatory call method with instructions which, when executed by the computer system, cause instructions of the software object to be executed to test that the state of the conformance-test enabled implementation conforms to the software specification during execution of the mandatory call method.

9. The computer-implemented method of claim 6 wherein applying the software implementation and the software specification to produce a conformance-test enabled implementation further comprises:
including in the conformance-test enabled implementation instructions of the software implementation to synchronize the state of variables of the software implementation with the state of variables of the software specification.

10. An article comprising:
a machine-readable storage medium comprising instructions to generate a conformance-test enabled implementation of a software specification, the instructions, when executed by a computer system, resulting in:
applying a software implementation source code and at least a portion of the software specification to produce the conformance-test enabled implementation comprising a same body of code with portions from both the software implementation and the at least a portion of the software specification in the same procedure; wherein the procedure comprises at least one portion of the software implementation and the at least one portion of the software specification; wherein nondeterministic choices of the at least one portion of the software specification result in assigning a corresponding choice of the conformance-test enabled implementation to a variable; and the conformance-test enabled implementation comprising a test that the variable comprises one of the nondeterministic choices of the at least one portion of the software specification;
compiling the software implementation from a first high-level language into an intermediate language;
compiling the software specification from a second high-level language into the intermediate language; and
producing the conformance-test enabled implementation in the intermediate language.

11. The article of claim 10 wherein the instructions, when executed by the computer system, result in:
the conformance-test enabled implementation comprising a test that the variable conforms to a condition on the nondeterministic choice specified in the software specification.

12. The article of claim 10 wherein the instructions, when executed by the computer system, result in:
the conformance-test enabled implementation comprising at least one first operation to carry out when the variable comprises one of the nondeterministic choices of the software specification; and
the conformance-test enabled implementation comprising at least one second operation to carry out when the variable does not comprise one of the nondeterministic choices of the software specification.

13. The article of claim 10 wherein the instructions, when executed by the computer system to apply the software implementation and the software specification to produce a conformance-test enabled implementation, result in:
including in the conformance-test enabled implementation instructions of the software implementation to synchronize the state of variables of the software implementation with the state of variables of the software specification.

14. The article of claim 10 wherein the instructions, when executed by the computer system to apply the software implementation and the software specification to produce a conformance-test enabled implementation, result in:
including in the conformance-test enabled implementation instructions of the software implementation to provide the choice of the conformance-test enabled implementation corresponding to the nondeterministic choice of the specification.

15. An article comprising:
a machine-readable storage medium comprising instructions to generate a conformance-test enabled implementation of a software specification, the instructions, when executed by a computer system, resulting in:
producing a software object organized such that a step of the software specification is surrounded by a corresponding code section of the software implementation in the software object, the software object having a class;
the software object comprising at least one instruction which, when executed by a computer system, causes an identification of a mandatory call comprised by the software specification to be stored in a memory of the computer system; and the software object comprising at least one instruction which, when executed by the computer system, causes a test that the state of the conformance-test enabled implementation conforms to the software specification during the mandatory call;
wherein the mandatory call comprises a call to at least one method in at least one class different than the class of the software object.

16. The article of claim 15 wherein the instructions, when executed by the computer system, result in:
the conformance-test enabled implementation comprising at least one instruction which, when executed by the computer system, causes a section of the software object to be executed prior to the conformance-test enabled implementation performing the mandatory call, the section of the software object to be executed corresponding to a step of the software specification comprising the mandatory call.

17. The article of claim 15 wherein the instructions, when executed by the computer system, result in:
modifying the software comprising the mandatory call method with instructions which, when executed by the computer system, cause instructions of the software object to be executed to test that the state of the conformance-test enabled implementation conforms to the software specification during execution of the mandatory call method.

18. The article of claim 15 wherein the instructions, when executed by the computer system, result in:
including in the conformance-test enabled implementation instructions of the software implementation to synchronize the state of variables of the software implementation with the state of variables of the software specification.

19. An apparatus comprising:
a processor; and
a machine-readable storage medium comprising instructions to generate a conformance-test enabled implementation of a software specification, the instructions, when executed by the processor, resulting in:
applying a software implementation and the software specification to produce the conformance-test enabled implementation within a same body of code with portions from both the software implementation and the software specification integrated into at least one procedure, wherein the at least one procedure comprises at least one portion of the software implementation and at least one portion of the software specification, wherein nondeterministic choices of the software specification result in assigning a corresponding choice of the conformance-test enabled implementation to a variable; and the conformance-test enabled implementation comprising a test that the variable comprises one of the nondeterministic choices of the at least one portion of the software specification;
compiling the software implementation from a first high-level language into an intermediate language;
compiling the software specification from a second high-level language into the intermediate language; and
producing the conformance-test enabled implementation in the intermediate language.

20. The apparatus of claim 19 wherein the instructions, when executed by the computer system, result in:
the conformance-test enabled implementation comprising a test that the variable conforms to a condition on the nondeterministic choice specified in the software specification.

21. The apparatus of claim 19 wherein the instructions, when executed by the computer system, result in:
the conformance-test enabled implementation comprising at least one first operation to carry out when the variable comprises one of the nondeterministic choices of the software specification; and
the conformance-test enabled implementation comprising at least one second operation to carry out when the variable does not comprise one of the nondeterministic choices of the software specification.

22. The apparatus of claim 19 wherein the instructions, when executed by the computer system to apply the software implementation and the software specification to produce a conformance-test enabled implementation, result in:
including in the conformance-test enabled implementation instructions of the software implementation to synchronize the state of variables of the software implementation with the state of variables of the software specification.

23. The apparatus of claim 19 wherein the instructions, when executed by the computer system to apply the software implementation and the software specification to produce a conformance-test enabled implementation, result in:
including in the conformance-test enabled implementation instructions of the software implementation to provide the choice of the conformance-test enabled implementation corresponding to the nondeterministic choice of the specification.

24. An apparatus comprising:
a processor;
a machine-readable storage medium comprising instructions to generate a conformance-test enabled implementation of a software specification, the instructions, when executed by a computer system, resulting in:
producing a software object organized such that a series of steps of the software specification and a corresponding code section of the software implementation are enmeshed in the software object, the software object having a class;
the software object comprising at least one instruction which, when executed by a computer system, causes an identification of a mandatory call comprised by the software specification to be stored in a memory of the computer system, wherein the mandatory call comprises a call to at least one method in at least one class different than the class of the software object; and
the software object comprising at least one instruction which, when executed by the computer system, causes a test that the state of the conformance-test enabled implementation conforms to the software specification during the mandatory call the conformance-test enabled implementation comprising at least one instruction which, when executed by the computer system, causes a section of the software object to be executed prior to the conformance-test enabled implementation performing the mandatory call, the section of the software object to be executed corresponding to a step of the software specification comprising the mandatory call.

25. The apparatus of claim 24 wherein the instructions, when executed by the computer system, result in:
modifying the software comprising the mandatory call method with instructions which, when executed by the computer system, cause instructions of the software object to be executed to test that the state of the conformance-test enabled implementation conforms to the software specification during execution of the mandatory call method.

26. The apparatus of claim 24 wherein the instructions, when executed by the computer system, result in:
including in the conformance-test enabled implementation instructions of the software implementation to synchronize the state of variables of the software implementation with the state of variables of the software specification.

* * * * *